Sept. 23, 1958
G. D. BALDWIN
2,853,595
VEHICLE LIGHT
Filed Aug. 19, 1955
2 Sheets-Sheet 1
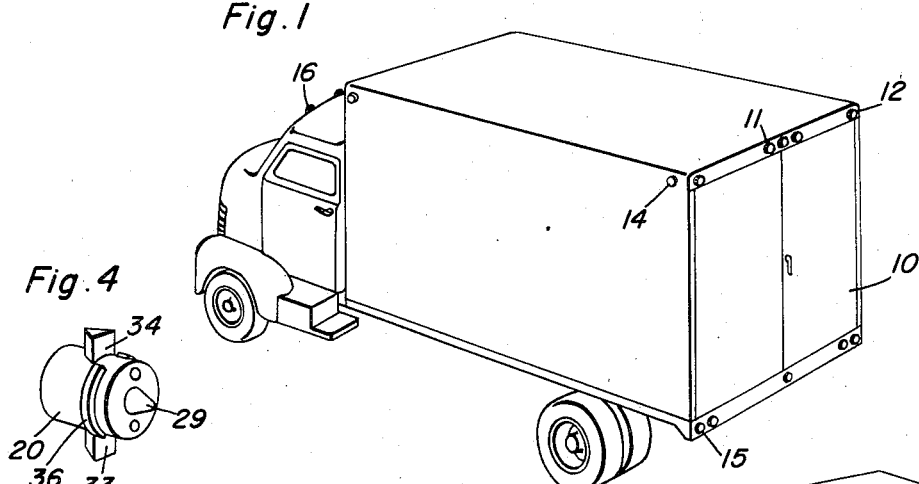
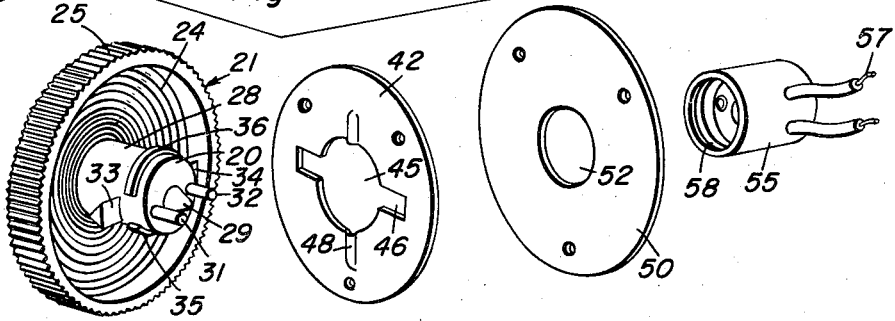
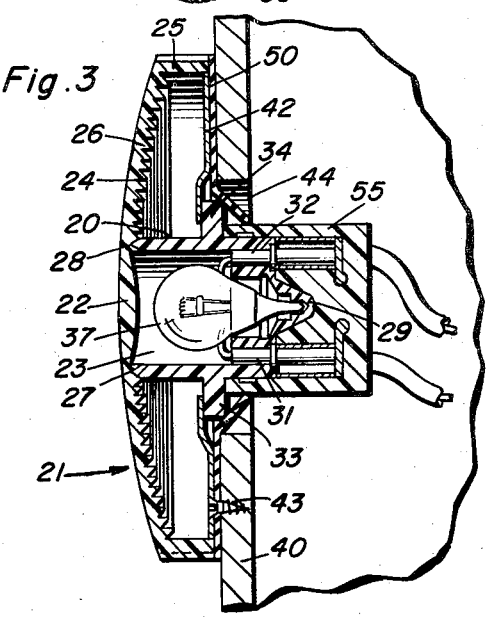
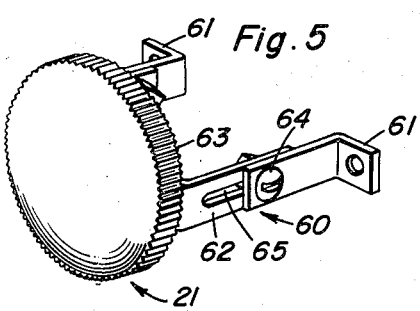
George D. Baldwin
INVENTOR.
BY *Clarence A. O'Brien*
*and Harvey B. Jacobson*
Attorneys Sept. 23, 1958   G. D. BALDWIN   2,853,595
VEHICLE LIGHT
Filed Aug. 19, 1955   2 Sheets-Sheet 2
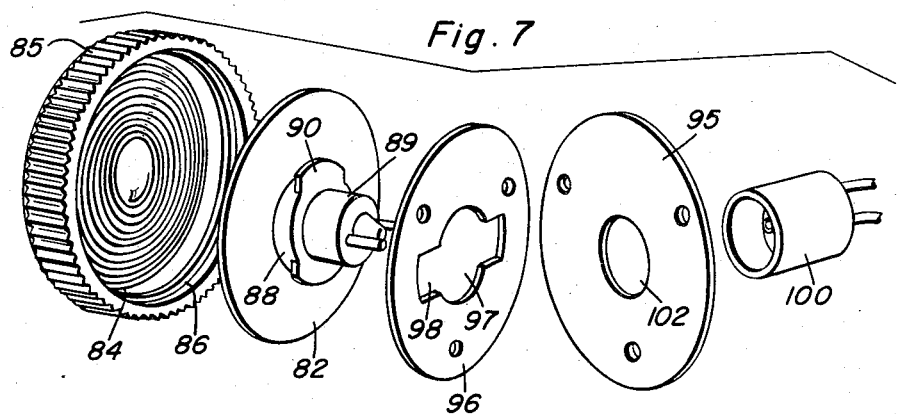
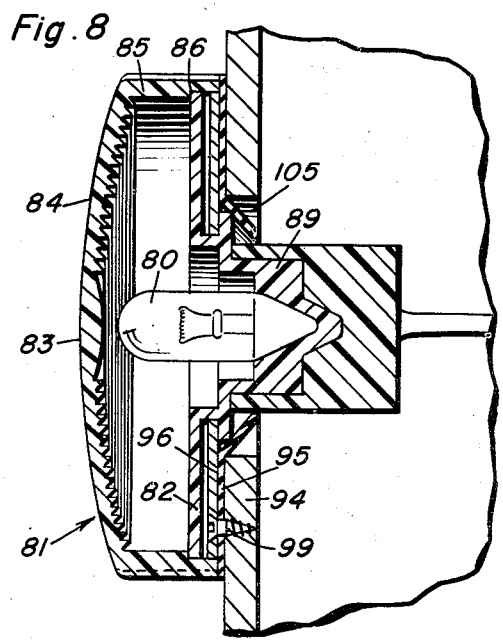
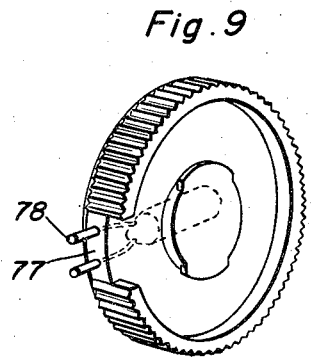
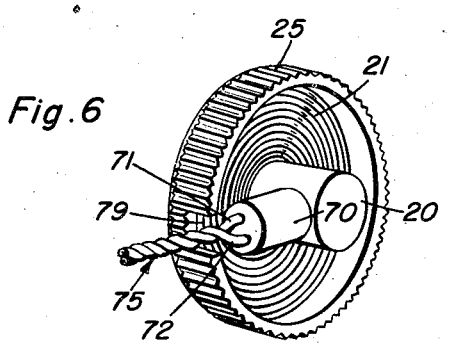
George D. Baldwin
INVENTOR.
BY *Clarence A. O'Brien
and Harvey B. Jacobson*
Attorneys

United States Patent Office 2,853,595
Patented Sept. 23, 1958

2,853,595

VEHICLE LIGHT

George D. Baldwin, Jamestown, N. Y., assignor to Truck-Lite Co., Inc., Jamestown, N. Y., a corporation of New York Application August 19, 1955, Serial No. 529,436

3 Claims. (Cl. 240—8.2)

This invention relates to vehicle lights and more specifically to vehicle lights of the type attached to the body of an automatic vehicle for the purpose of indicating the dimensions of the vehicle or the operations performed by the same, and it has for one of its principal objects a vehicle light construction which is extremely simple, of light weight and corrosion proof, which is completely protected against atmospheric influences and which is of the smallest possible dimensions with respect to protrusion from the body of the vehicle or with respect to projection towards the interior thereof.

A further main object of the invention is to provide a wide angle visibility of the vehicle light which extends over an angle of about 180°.

An operator of vehicles and especially the operator of trucks or similar vehicles is confronted with a number of problems with respect to the lighting of the vehicle, presented on one hand by the necessity of sufficiently delineating for the other users of the road the dimensions of the vehicle and by the necessity of indicating in advance the intended operation of the vehicle, the former necessity entailing the installation of a relatively large number of vehicle lights, while on the other hand the steadily increasing size of the trucks approaches so closely the maximum allowed that projecting lamps can no longer be accommodated without a serious loss of loading space or of relatively costly changes for mounting the lamps in the interior of the body structure.

Further, the number of lights is steadily increased in order to give to the other users of the road an exact dimension of the vehicle whatever the viewpoint. This large number of lamps seems to be necessary because trucks are constantly passed by other vehicles and wrong guesses with respect to width or length of the trucks lead to accidents.

The lights, and more especially the tail lights and direction lights, but preferably all the lights, should be clearly visible over a wide angle, the ideal angle being 180° or an angle closely approaching 180°, in order to delineate the contour of the vehicle also when it starts to turn or when it proceeds to round a corner.

With a large number of lights the problem of keeping the lights operative and undimmed under all atmospheric conditions becomes more difficult, especially as the increased number of lamps calls for an inexpensive type of lamp.

The principal object of the invention is essentially to provide a construction which completely or almost completely eliminates these and a number of further difficulties connected with the installation and operation of vehicle lights.

According to the invention a light weight, corrosion proof, completely sealed lamp unit is provided in which the lamp bulb is enclosed and sealed within a bulb chamber which forms a unitary structure with the light collimating and light diffusing lens body, the entire unitary structure consisting preferably of a resinous transparent plastic.

The unitary plastic structure which is provided with the necessary double connections for electric currents permitting grounding of the lamp at a desired point, is characterized by a lens which is joined to the bulb chamber in such a manner that it forms with the bulb chamber a single body sealing in the bulb chamber completely. The front portion of the lens is provided, in a well known manner, with light diffusing serrations. This serrated portion of the lens is surrounded by a lens portion, projecting axially and rearwardly from the rim of the serrated light diffusing portion. This axially and rearwardly extending portion may also be serrated or knurled so as to be light diffusing. Both the serrated radially extending portion and the axially extending serrated or knurled portion are illuminated and the light is thus visible from any point, up to points which are positioned in directions at right angles to the optical axis of the lens, so that the diffused light in fact remains visible over an angle of around 180° and more.

It is a further object of the invention to provide a vehicle position light consisting of a unitary structure composed of a completely sealed and completely transparent bulb chamber containing a lamp bulb, said chamber being partly formed by the lens from which a portion of the lens projects freely in an axial direction with its edge unattached.

A further object of the invention consists in using the axially extending portion of the lens not only for the purpose of diffusing light in a direction substantially at right angles to the optical axis of the lens, but to use this portion in addition by pressing it against a suitable base member to seal off in a liquid tight manner the space surrounding the transparent bulb chamber, so as to avoid the deposition of dust and other particles and moisture and condensation of the latter on the inside of the lens or on the walls of the bulb chamber, which surfaces thus remain completely transparent for the light rays produced by the bulb contained in the bulb chamber.

It is a further object of the invention to provide a vehicle position light consisting of a unitary structure, which structure includes a completely and permanently sealed bulb chamber, one wall of which is formed by the body of the lens, while another wall is formed by a disk arranged in substantial parallelism to the lens, the outer walls being formed by a portion of an axially extending rim portion projecting rearwardly from the lens.

A further object of the invention consists in providing a vehicle position light consisting of a unitary structure composed of a completely sealed and completely transparent bulb chamber containing a lamp bulb, which chamber is formed by a transparent cup-shaped member, welded or otherwise united to a central portion of the lens being which may be collimating the rays emitted, the remainder of the lens preferably provided with light diffusing means, projecting freely in a radial direction beyond said chamber and being unattached.

It is a further object of the invention to provide a vehicle position light as characterized in the preceding paragraph, the unattached lens portion of which carries an axially extending serrated or knurled light diffusing portion.

It is a further object of the invention to provide a vehicle light consisting essentially only of a transparent plastic.

According to a further object of the invention a vehicle light is provided which consists of a transparent sealed bulb chamber joined to a portion of the lens which is so shaped that it directs the light collected by it to form a beam, said portion being part of the bulb chamber, while further portions of the lens receive their light through the side wallls of the bulb chamber and diffuse the same over a wide angle, while a still further portion of the lens along the rim of the same diffuses the light in a plane essentially at right angles to the axis of the beam projected through the central portion, thus permitting a viewing of the light emanating from the said lens during a turning of the vehicle through an angle up to 90° on each side.

According to a further object of the invention a vehicle light is provided which is corrosion proof, of great lightness and compactness, and so constructed that its depth dimension is reduced to a minimum and is only a fraction of the diameter of the lens.

A still further object of the invention consists in providing a vehicle light which is easily attachable and detachable and which can be supported, on account of its light weight, in any manner in which a small light bulb may be supported.

A still further object of the invention consists in providing a vehicle light of the type above characterized having an axially extending lens section surrounding the rim of the lens which may be tightly pressed against the side of the wall on which it is mounted so as to seal also the space surrounding the lamp bulb chamber to protect it against atmospheric influences.

Further objects of a more specific nature will be apparent from the following detailed specification describing the details of the construction and operation with reference to the accompanying drawings.

The invention is illustrated in the accompanying drawing showing two specific modifications and two ways of mounting the same. It is however to be understood that the illustration is exemplificative and is not intended to give a survey of the possible structures incorporating the invention; it intends to illustrate the principle of the invention and the best mode of applying said principle. A departure from the structural details of the embodiment of the invention illustrated is therefore not necessarily a departure from the principle of the invention.

In the drawings:

Figure 1 is a perspective view of a truck provided with clearance lights, tail lights and direction lights constructed according to the invention.

Figure 2 is an exploded perspective view of a vehicle light, its socket and the parts serving to attach the vehicle light.

Figure 3 is an elevational sectional view through a vehicle light mounted on the side wall of a truck, the section being taken along a vertical median plane.

Figure 4 is a perspective view of the cylindrical body enclosing the bulb chamber.

Figure 5 is a perspective view of a modified mount.

Figure 6 is a perspective view of a vehicle light bulb of the type illustrated in Figures 2-4, which is provided with side connections.

Figure 7 is an exploded perspective view of a modified vehicle light and its mounting means, which is adapted to house a lamp bulb of higher candle power.

Figure 8 is an elevational sectional view of the modified vehicle light illustrated in Figure 7, the section being taken along a vertical median plane.

Figure 9 is a perspective view of a modified vehicle light, such as shown in Figures 7 and 8, provided with lateral connections.

For a better understanding of the invention, it may first be pointed out that practically all position and direction light constructions for vehicles have a basic arrangement which is similar to that of the headlights of a vehicle. This arrangement includes a housing with a reflector being open in the front which front is closed either by diffusing lens or by a combined collimating and diffusing lens or other optical means. The diffusing lens covers the entire front of the reflector and housing and is gripped along its rim by the housing or by the reflector. At this point the rim is sealed against the housing by some sealing means, such as an annular rubber gasket or the like to prevent atmospheric water and dust to penetrate into the interior of the housing.

This general construction however has the disadvantage that it occupies much space especially in the direction of depth and that it is relatively heavy and must therefore be supported by special supporting means. Clearance lights sometimes consist practically only of light bulbs but then have no diffusing lenses and the light distribution therefore is represented by an elongated lobe so that the angle under which the lights are seen is very small.

The reduction in the direction of depth is of greatest practical importance in connection with big trucks, the bodies of which fill the available profile almost completely so that lights mounted on them either violate some regulation or have to be embedded within the body of the truck, both ways being considered as being of disadvantage.

The invention intends to provide a vehicle light which has the smallest possible weight, the smallest depth dimention and the largest possible angular light diffusion and which permits ready attachment and detachment.

A vehicle light according to the modification of the invention illustrated in Figures 2-4 consists of a single body of a resinous transparent plastic material which has been produced by uniting either by heating or by means of a solvent for the plastic or by means of an adhesive for the plastic capable of producing a unitary structure, or by other means, the two main elements of the lamp. These two main elements are a transparent body 20 in which the light bulb chamber 23 is formed, and the optical element 21. This latter element essentially consists of three sections. The central section 22 is formed by a convex or a plano-convex lens and is the collimating element which produces a light beam of substantially parallel rays thrown in one direction. On the inside this central portion 22 is surrounded by a V-shaped groove 27 for a purpose to be described.

The second section of the optical element 21 is a light diffusing section 24 which surrounds the central section 22 and which is provided with light diffusing annular ribs or serrations 26. This section is usually somewhat curved and forms part of a sphere or of another body of rotation. The construction of the lens element in itself follows well known lines, the two sections 22, 25 from an optical standpoint being constructed like similar portions of any Fresnel lens.

The lens body, according to the invention, however, has a third axial section 25 which is preferably cylindrical and which projects inwardly, from the outer edge or rim of the section 24. This portion is serrated or knurled the serrations being preferably arranged on the outside. On account of the curvature of the serrated section 24 the entire axial section 25 is located inwardly at some distance relatively to the central section 22.

The light bulb chamber 23 is formed within a small cylindrical completely transparent body 20 which is open only at its end before the chamber has been formed and which is afterwards closed when the light bulb has been inserted and the said body is joined to the lens element 21. The outer edge of the cylindrical body 20 at the end which is joined to the lens portion is preferably wedge-shaped in order to fit into the V-shaped groove 27 surrounding the central portion 22 of the lens body at the inner side. Joining, as above mentioned, is performed by using a suitable solvent for the resinous transparent plastic or an adhesive compatible with said plastic which forms out of the body 20 and the lens a single unitary structure, by welding using heat, or the like.

The bottom of the cylindrical body 20 is suitably shaped to receive the end of a light bulb which, in the example illustrated, is of the type termed "embedded bulb" which has a pointed end. Accordingly, to accommodate the end, the bottom is provided with a projecting conical protuberance 29 in the center.

The lead-in wires for this type of bulb usually leave the bulb on the side above the press and therefore two lateral connecting pins 31, 32 are arranged with which these lead-in wires are connected. These pins are, of course, inserted before the cylinder 20 is joined to the lens 21. The pins project through appropriate holes in the bottom to the outside and are provided with means for tightly sealing the said openings after the pins have been inserted.

In order to support the structure the cylindrical body 20 is provided with two laterally projecting holding brackets or arms 33, 34 of triangular cross-section which serve to hold the entire lamp structure on a base in a manner to be described.

Two collar segments 35, 36 are provided on the outer cylindrical wall of the cylinder 20 and are axially spaced from the two holding brackets or arms 33, 34. They serve the purpose of holding the socket firmly on the cylinder in a manner explained below.

After the insertion of the bulb into the cavity of the cylinder 20 and after welding the plastic materials together so that they form a single body, the lamp is complete and can now be used as a unit.

The pins 31, 32 may be inserted into any socket and the entire lamp structure may be supported by the said socket with the rim of the lens element projecting freely into the air. It is however preferable to attach and carry the lamp in a manner which will be described in connection with Figure 3.

The free rim of the lens is a major advantage as the depth dimension of the lamp in this way is extremely small and is not much larger than the axial cylindrical portion of the lens. In any case the depth dimension is not larger than the length of the cylindrical body 20 which only slightly exceeds the height of the light bulb. The lamps therefore may be mounted in different ways and may be used as position stop or direction lights or as a combined tail and direction light. On account of the lightweight of the whole structure, the lamp may be mounted in any way in the manner in which a light bulb is mounted. This is a major advantage for a vehicle light to be used on a truck body as the sockets and facilities for the lights on the various types of trucks vary greatly.

The preferable method of mounting is illustrated in Figure 3. Obviously other methods of mounting may be used or may be combined with the method shown in Figure 3.

As seen in Figure 3 the vehicle light is essentially mounted within an opening 44 provided in the side wall of the truck which is indicated at 40. As seen the socket for the lamp structure projects only slightly into the interior. The vehicle light unit projects slightly from the wall towards the outside but as will be seen from the figure the depth dimension is not larger than the length of the cylindrical portion of the body 20 contained between the central lens portion 22 and the holding brackets 33, 34. This depth dimension, therefore, is only a fraction of the depth dimension of known vehicle lights whose depth dimension, without the socket and other holding facilities, are usually equal to the length of a lens diameter.

In order to hold the unitary combined lens and lamp structure a spring locking disk 42 or diaphragm preferably made of stainless steel or of another somewhat elastic material is fixed on the wall 40 of the vehicle around the aperture 44 by means of screws 43 or other fixation means on the side wall 40 of the vehicle. The spring locking disk or diaphragm has a central circular opening 45 with lateral extensions 46 through which the triangular holding arms or brackets 33, 34 of the cylindrical body 20 may pass. At right angles to these extensions V-shaped locking grooves 48 are pressed into the disk or diaphragm 42. They receive the edges of the triangular brackets 33, 34 when the cylindrical body 20 has been inserted.

In the modification illustrated in Figure 3 an elastic rubber disk 50 provided with a central opening 52 is fixed beneath the spring lock ring or diaphragm 42. The central opening 52 of the rubber disk is just sufficient to allow the passage of the cylindrical body 20 and it may even be slightly smaller than the said body. The outer diameter of the disk in the modification illustrated in Figure 3 is slightly larger than the diameter of the spring lock ring or diaphragm 42. The rubber disk 50 and the spring lock ring 42 are both fixed on the side wall 40 by means of the same screws 43.

When this spring lock ring 42 and the rubber disk 50 have been mounted they form the holder for the vehicle light. The cylindrical body and the two lateral supports 33, 34 are passed through the lateral extensions 46 and the opening 45 when the vehicle light is mounted and they press the rubber ring back when so inserted. The whole lens body is then turned around through 90° so that the said triangular supports snap into the grooves 48. As the inner edge of the axial section of the lens body is thereby applied against the side wall of the truck the unit is thus firmly and resiliently held on said side wall.

The unit may be used with or without a socket 55, which is preferably of cylindrical shape and may be made of some elastic material like rubber or resilient plastic. The socket consists of a solid cylindrical body provided near one end with a cavity for receiving that portion of the cylindrical body 20, containing the light bulb chamber, which extends beyond the triangular supporting arms 33, 34. In the modification shown in which this portion is provided with a conical projection 29, the body 55 must also be provided with a corresponding cavity in order to accommodate the projection. Further, a groove 58 may be provided near the edge of the cavity to take up the collar segments 36 of the cylindrical body. These segments may be shorter than shown and may then be inserted through corresponding recesses, but preferably the socket by virtue of its elasticity is snapped on into its position. When the unit is used without a socket the wires of a cable may be directly attached, the unit itself being held firmly by means of the lock ring 42.

In the modification illustrated in Figure 3 the rubber disk 50 as has been mentioned protrudes and extends beyond the lock ring 42 and the cylindrical portion 25 of the lens body 21 may be applied against it thus, in addition, sealing the space surrounding the lamp bulb chamber completely and protecting the back of the lens against deposits of dust, snow or atmospheric water.

Another method of supporting the vehicle light is illustrated in Figure 5. The structure in this case is supported on an adjustable holder 60 consisting of two feet or brackets 61 mounted on the side wall of the truck which carry slidably extension members 62, holding the disk member 63 to which the vehicle light body 21 is attached in the manner above described.

Screw bolts or rivets 64 in the feet 61 and slots 65 permit to regulate the distance of the vehicle light from the supporting surface, thus permitting adaptation of the vehicle light to various conditions, for instance mounting on a receding portion of the truck, or protruding to a desired degree. Moreover the base plate of the feet 61 may have curved surfaces or may be placed at an angle relatively to the projections so that they conform themselves to rounded surfaces. This permits mounting of the vehicle light in any desired position.

Instead of connecting the vehicle lights of a truck in the manner shown in Figures 2 and 3, the construction according to the invention also permits lateral electrical connection. Such lateral connection may be made for instance in the manner illustrated in Figure 6.

According to this modification the central body 20 which is identical with the body having the same reference numeral in Figures 2, 3 and 4 is provided with a lateral extension, which carries the socket 70 of the lamp bulb. The lamp bulb (not shown) is then inserted into this socket with its longitudinal or main axis aligned with the socket, and at right angles to the axis of the lens body and of the body 20. The wires 71, 72 of the cable, indicated at 75 may be directly connected with the socket contacts, as shown in Figure 6 or a lateral socket 77 may be provided (as shown in Figure 9 in connection with another modification) the prongs 78 of which permit an easily detachable lateral connection.

The cable 75 in the case illustrated leads through a cut portion 79 of the axial lens portion which is not closed, but if a sealed arrangement is desired a small suitably sealed opening is provided through which the cable passes to the outside. If a lateral socket is provided, it may fill the opening which is made in the rim portion of the lens.

The arrangement shown in Figure 6 has the advantage that a lamp bulb of larger candle power can easily be used.

The modification of the invention illustrated in Figures 7 and 8 is especially suitable for lamp bulbs of relatively high candle power which are of a larger size than the lamp bulbs illustrated in Figures 2 and 3.

Such bulbs develop a larger amount of heat in operation and therefore it is necessary to provide a bulb chamber of a larger volume. The bulb 80 is therefore enclosed in a bulb chamber which is formed by the lens 81 on one side and a disk 82 and disk mount which is united with the lens body at the rim portion 85. The lens 81 itself has the construction already described. It comprises a central collimating lens 83, a serrated light diffusing portion 84 surrounding the central lens 83 and an axially and rearwardly projecting light diffusing portion 85 which is knurled or serrated. This axially projecting portion is stepped on the inside at 86 and on this step the disk 82 rests which carries the lamp bulb. The said disk 82 is welded or cemented to the lens at this step either by the application of heat (heat sealing) or by the application of a solvent and by using one of the well known processes for welding, cementing or bonding resinous plastics. Also adhesives may be used to hold the disk permanently in place.

The lens and the disk 82 therefore, as described above form a unitary body enclosing a permanently sealed bulb chamber which holds the bulb and its socket and which is fixedly held on the truck as a unit. The disk mount which forms the central part of the disk comprises a cylindrical rearwardly projecting socket portion 88, 89 which, preferably, is partly hollow to increase the axial width of the chamber in the center where the lamp bulb 80 is mounted, so as to permit the insertion of a relatively large lamp bulb. This socket portion may be stepped and may consist of two cylindrical portions of different diameter 88 and 89, respectively. The cylinder 89 ends in a hollow conical projecting portion taking up the conical end of the lamp bulb 80.

The cylindrical socket portion 88 is provided with two laterally projecting arcuate wing segments 90, each wing occupying an arc of less than 90°. By means of these wing segments the light is fastened on the truck. On the wall 94 of the truck a rubber disk 95 with a central opening 102 and a disk of metal or some other rigid material 96 is mounted, so that they surround an opening 105 in the wall of the truck body. The disks may be held in their position by screws 99. The metal disk 96 has a central circular opening 97 with two lateral extensions at diametrically opposite ends. The circular opening is of such size that the cylindrical socket portion 88, 89 may pass, while the extensions or wing segments 90 may pass through the lateral extensions 98 of the opening after rotation of the light bulb carrying structure through 90°. When rotating the structure both wings are gripped and held behind the plate or disk 96, while simultaneously the edge of the axial portion 85 is pressed against the rubber disk 95. The rubber disk may be dispensed with as liquid tight sealing is not necessary.

As seen in Figure 8 the lamp bulb has sufficient axial space and the sealed bulb chamber is of sufficient size and has sufficient cooling surface to prevent heating of the lens, disk and socket, enclosing the bulb chamber to a temperature which might affect the resinous plastic.

As seen in Figure 9 the bulb chamber construction may also be modified and a lateral plug connection may be provided for the current supply of the bulb. The socket in this case is preferably also cemented to the disk and forms one piece with it. The lamp bulb is so arranged that it is held in the socket and its axis is therefore at right angles to the axis of the lens. This modification has the major advantage that it can be fixed on the outside of the vehicle without penetration into the wall. The extent to which the unit shown in Figure 9 protrudes is moreover smaller than that of any lamp hitherto used, as the depth is only ⅝" on the average unit.

All the vehicle lights above described are inexpensive and are preferably of the type which are discarded when the bulb burns out or some other defect occurs.

The constructions above described have the major advantage that the vehicle light is extremely light, consisting essentially of a body of transparent plastic, so that it can be supported by lightweight supports. It moreover combines lightweight with great compactness requiring only minimum dimensions in all directions and especially in the direction of depth. Moreover, the light forms a single unitary body and not a mere assemblage.

This body has many optical advantages. While that part of the light beam which is to be used substantially in the direction of the axis of the lens is collected by the same and is essentially a collimated beam, the light rays from the bulb which are emitted under an angle to the optical axis light up the serrated portion of the lens which portion diffuses the light and leaves the lens in a somewhat divergent beam so that the lens looks much larger when seen from a distance. This light distribution makes the lens body also particularly suitable for turn signals as the beam is also seen after the vehicle has started to turn. In particular the illuminated portion 25 is seen at right angles to the lens axis and is therefore seen after the vehicle has turned around through 90° and even somewhat beyond so that the driver of a vehicle following the truck equipped with this vehicle light would see the lights of the truck whether the vehicle has turned through 90° to the right or to the left. The light is thus visible in positions 180° apart.

The viewability of the light is also of importance for the clearance lights. Normally clearance lights mounted on the side of the vehicle are not seen from behind at least if they have flat lenses. The lights according to the invention, if used as clearance lights, are also visible from behind and they thus delineate for a driver following the vehicle equipped with these lights the outline of the truck, permitting to gauge the width of the available space before the driver starts to pass.

The light may, of course, be used as a combined stop light and direction signal and will then have the advantage to be seen after the vehicle starts to turn and even after the turn is completed, even if no lateral clearance light should be mounted.

It has further been found that small candle power lights when used in connection with this type of vehicle lights gives results which are as good or even better than higher candle power lights.

The vehicle light according to the invention is completely corrosion proof as it is practically a single body of resinous plastic. For the same reason it is also extremely light and compact and is easily attachable and detachable.

What is claimed as new is as follows:

1. A vehicle light carried on an outside wall of a vehicle comprising an assembly of fixedly and permanently attached parts joined to produce a unit forming a single rigid piece and provided with means for the simultaneous mechanical attachment and making of electrical contact, said assembly consisting of a substantially cylindrical body of resinous plastic enclosing a permanently sealed chamber, said chamber housing an electric light bulb and having a front wall facing the bulb shaped to form two concentric lenses, one being a collimating lens and the other a diffusing lens, a cylindrical side wall surrounding the said lamp bulb, and a rear wall with a central socket portion carrying the lamp bulb and contacts for the same permanently welded to said side wall, sealing means projecting rearwardly from said unit for sealing a space between the chamber and the outer wall of the vehicle, the outer wall being provided with a perforation, a socket member with contacts connected to a source of current behind said perforation, adapted to receive the socket portion of the rear wall of the chamber and to produce contact with the socket portion contacts, a resilient member on said outside wall of the vehicle surrounding the perforation, and fixation means on said outside wall of the vehicle and on the said unit adapted to engage each other, said engagement bringing the sealing means on the unit into sealing engagement with the resilient sealing means on the outside wall of the vehicle and the socket portion of the rear wall into engagement with the socket carried by the outside wall of the vehicle, connecting the source of current with the lamp bulb and simultaneously fixing the unit in its position with the space between the lamp bulb chamber and the outer wall surrounding the perforation tightly sealed.

2. A vehicle light carried on the outside wall of a vehicle, comprising a transparent body of resinous plastic with a cylindrical side wall enclosing a completely and permanently closed and sealed chamber, a light bulb enclosed within said permanently closed and sealed chamber, said transparent body and light bulb forming a single unitary one-piece structure with a front wall the central portion of which is shaped to form a collimating lens and a concentric surrounding serrated portion forming a diffusing Fresnel lens, the rear wall of the chamber being provided with a central socket portion holding the lamp bulb in a central position for throwing light simultaneously through both lenses and through the cylindrical side walls, said cylindrical walls having rearwardly projecting rim portions forming annular sealing rims, the outside wall of the vehicle being provided with a perforation and with a resilient disk surrounding said perforation and cooperating with the said sealing rims to enclose and temporarily seal the space enclosed between the outside wall of the vehicle and the chamber, a socket with contacts connected with an electric power supply axially aligned with the perforation in the outside wall of the vehicle, receiving the socket portion of the bottom wall of the chamber, interengaging fixation means mounted on the said outside wall of the vehicle on one side and projecting from the rear wall of the chamber on the other side, said fixation means when engaged producing axial pressure on the cylindrical transparent body applying the sealing rims on the transparent body against the resilient sealing disk on the outside wall of the vehicle and simultaneously fixing the said unit on the outside wall of the vehicle and producing contact between the contacts of the socket portion of the rear wall and the contacts in the electric power supply circuit.

3. A vehicle light as claimed in claim 2, wherein the bottom wall of the chamber carrying the lamp bulb is of disk shape, and cylindrical walls of the transparent body are provided with stepped portions on the inside, the stepped portions receiving and lodging said disk which is welded to the inside of the cylindrical wall so as to form a unitary structure permanently sealed and enclosing said chamber containing the light bulb.

References Cited in the file of this patent

UNITED STATES PATENTS

| | | |
|---|---|---|
| 1,088,863 | Young et al. | Mar. 3, 1914 |
| 1,403,924 | Topping | Jan. 17, 1922 |
| 1,588,522 | Browne | June 15, 1926 |
| 2,318,311 | Hicks | May 4, 1943 |
| 2,343,754 | Donley | Mar. 7, 1944 |
| 2,362,173 | Swanson | Nov. 7, 1944 |
| 2,679,576 | Mears et al. | May 25, 1954 |
| 2,685,639 | Wiley | Aug. 3, 1954 |
| 2,757,275 | Lehr | July 31, 1956 |